United States Patent
Maenza

[11] Patent Number: 6,076,165
[45] Date of Patent: Jun. 13, 2000

[54] METHOD FOR AUTHENTICATING DIGITAL RECORDING DEVICES

[75] Inventor: Glenn J. Maenza, Glen Mills, Pa.

[73] Assignees: Sony Corporation, Tokyo, Japan; Sony Electronics, Inc., Park Ridge, N.J.

[21] Appl. No.: 09/008,598

[22] Filed: Jan. 16, 1998

[51] Int. Cl.[7] ............................. G06F 12/14; G06F 11/00; G11B 23/28
[52] U.S. Cl. .......................................................... 713/200
[58] Field of Search ............................. 713/200; 714/30, 714/48, 6, 800, 45; 380/3, 4; 711/164

[56] References Cited

U.S. PATENT DOCUMENTS

| | | | |
|---|---|---|---|
| 5,315,448 | 5/1994 | Ryan | 360/15 |
| 5,408,477 | 4/1995 | Okada | 371/37.4 |
| 5,513,260 | 4/1996 | Ryan | 380/3 |
| 5,659,613 | 8/1997 | Copeland | 380/3 |
| 5,664,099 | 9/1997 | Ozzie et al. | 713/200 |
| 5,771,291 | 6/1998 | Newton et al. | 713/202 |
| 5,809,006 | 9/1998 | Davis | 369/275.4 |
| 5,809,545 | 9/1998 | Ozaki | 711/164 |
| 5,896,355 | 4/1999 | Sako | 369/58 |
| 5,928,363 | 7/1999 | Ruvolo | 713/201 |
| 5,930,209 | 7/1999 | Spitzenberger | 369/32 |
| 6,006,328 | 12/1999 | Drake | 713/200 |

*Primary Examiner*—Joseph E. Palys
*Assistant Examiner*—Willie Martin
*Attorney, Agent, or Firm*—Ronald P. Kananen; Rader, Fishman & Grauer

[57] ABSTRACT

A method for authenticating digital storage devices, including compact discs, CD-Roms, DVDs and floppy discs, is provided. A predetermined "fingerprint" code is embedded in one or more of the parity bytes which are always appended to the end of data frames for the purpose of detecting and correcting errors in the data frames as they are read from the digital storage devices by playback devices, such as CD players, computers, and DVD players. The "fingerprint" code is embedded during the mastering process of the originally-produced, authentic storage device by a "fingerprint" encoder implemented by either hardware or software. The "fingerprint" is not transferred to target storage devices when the original storage device is copied because standard duplicating equipment do not have the "fingerprint" encoder which will be used by mastering equipment. If one attempts to use an unauthorized duplicate copy of an authentic storage device, a "fingerprint" detector in the playback device will detect whether the predetermined "fingerprint" is present and act accordingly.

22 Claims, 3 Drawing Sheets

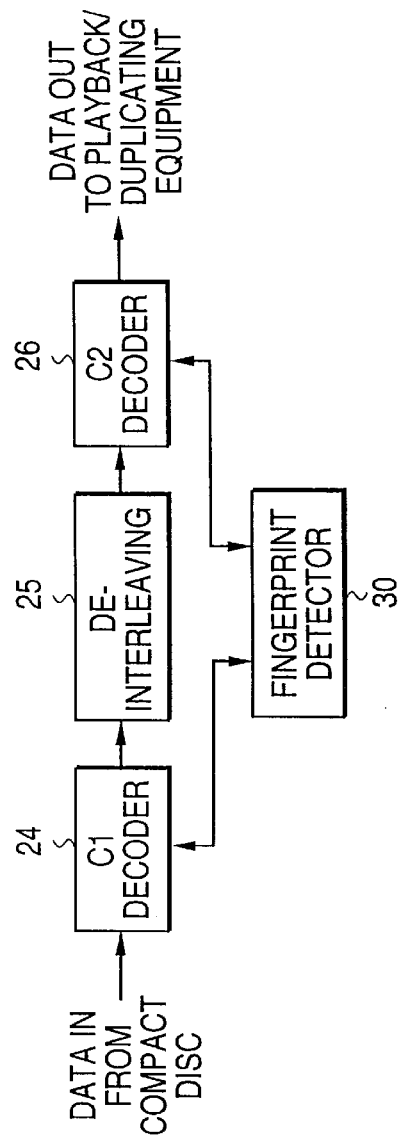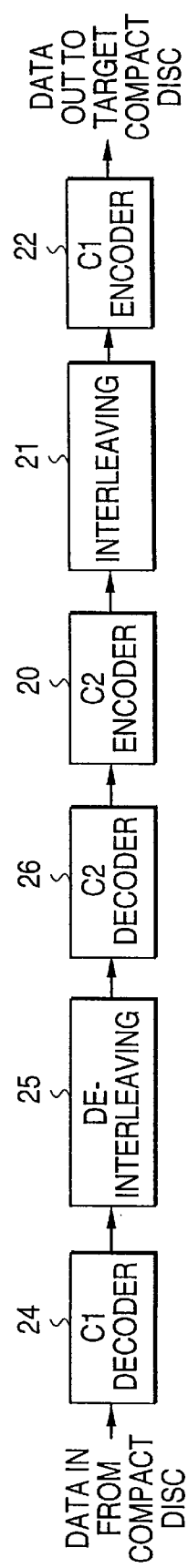

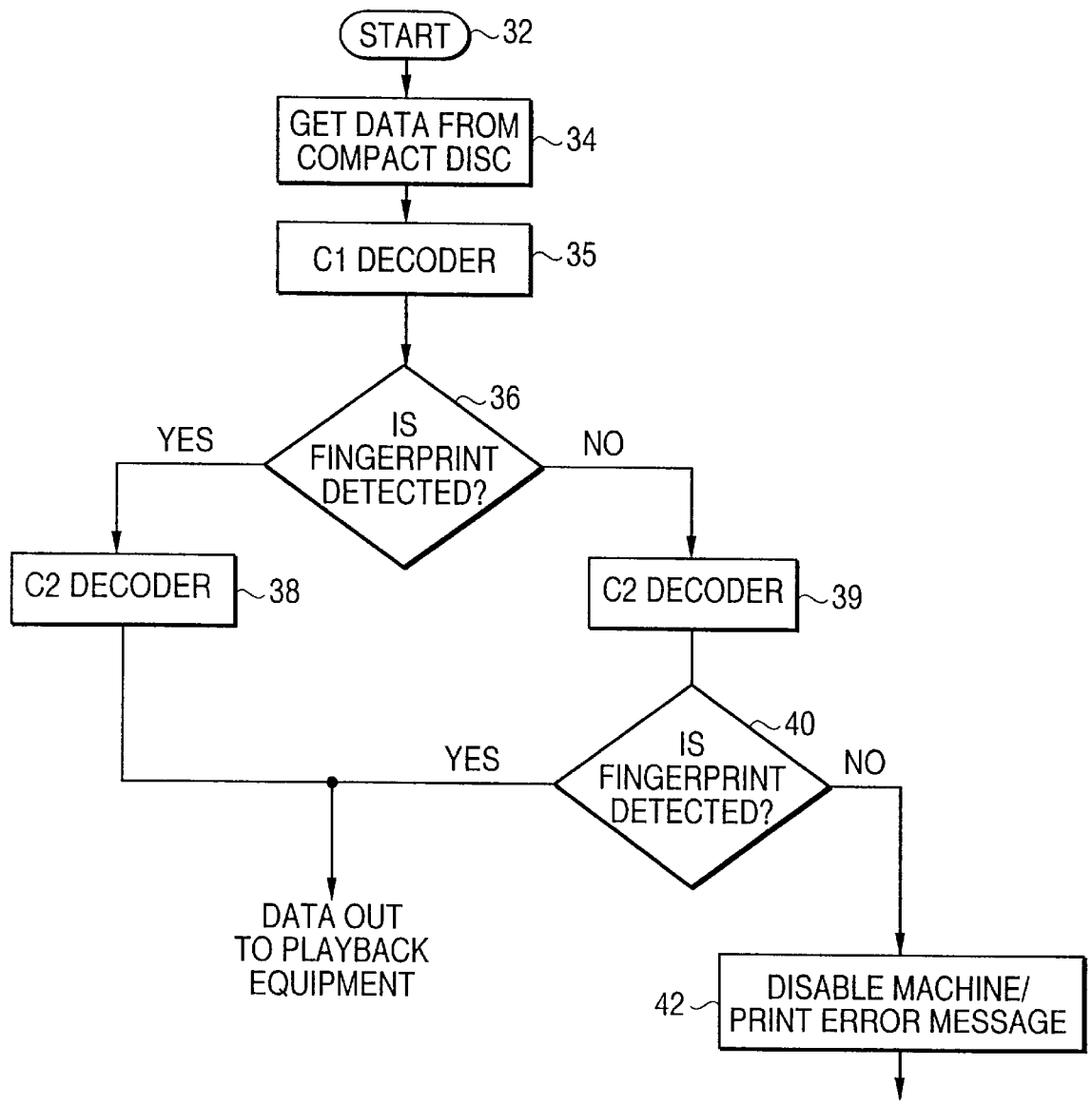

METHOD FOR AUTHENTICATING DIGITAL RECORDING DEVICES

FIELD OF THE INVENTION

This invention relates to digital storage devices, and more particularly to providing a method for authenticating originally-produced digital storage devices to discourage unauthorized copying of such discs.

BACKGROUND OF THE INVENTION

In recent years, the use of optical information storage discs, more colloquially known as "compact discs", "CD-ROMs", "CDs" or "DVDs" has increased in popularity across various industries. Music and computer software are regularly distributed on compact discs. Feature-length films are also beginning to be distributed on compact discs.

One of the major issues facing the music, software, and movie industries as distribution of such products on compact discs becomes more popular is the prevalence of unauthorized copying, or "pirating", of original compact discs. Compact disc pirating around the world cuts sharply into sales and royalties to music, software, and movie developers and manufacturers. As duplicating equipment has become cheaper and more accessible, compact disc pirating has increased dramatically. Therefore, it is desirable to employ a method to discourage or eliminate compact disc pirating.

In the field of computer software, some have attempted to curb compact disc pirating by incorporating unique machine-readable serial numbers on each compact disc manufactured. A human-readable version of the same serial number is distributed in the software packaging, such as in the user-manual. When the user installs the software on a computer, the installation algorithm asks the user to input the serial number. The installation algorithm then compares the user-input serial number to the machine-readable serial number on the compact disc. If they match, the user is permitted to continue installation of the software. If they do not match, an error message is displayed, and the installation algorithm stops. This method is intended to curb compact disc pirating by requiring the user to have a piece of information (the serial number) that is not an integral part of the compact disc itself. Those wishing to pirate compact discs employing this method can easily get around this method by distributing the human-readable serial number along with the pirated compact discs. Furthermore, this method of curbing pirating is not suitable for music or movie compact discs.

SUMMARY OF THE INVENTION

It is an object of the present invention to provide a method for embedding a machine-readable "fingerprint" on each originally-produced, authentic digital storage device that is not able to be copied using standard duplicating equipment. It is another object of the invention to provide a method for using the embedded fingerprint to discourage or eliminate compact disc pirating.

The objects of this invention are accomplished generally by embedding a "fingerprint" code in the error detection, or "parity", bytes of one or more data frames on the compact disc. Since parity bytes do not constitute part of the data that is utilized or played by the playback equipment, such as computers, CD players and DVD players, the "fingerprint" code is undetectable by a user and does not affect the quality of the real data. The "fingerprint" code is programmed into the parity bytes of one or more data frames by either hardware or software that works in conjunction with widely-used compact disc mastering equipment. The "fingerprint" code is not able to be copied by standard duplicating equipment typically used to pirate compact discs because the parity bytes (where the "fingerprint" code is stored) are stripped from each data frame by standard duplicating equipment when the data frames are read from the originally-produced, authorized compact disc. When the data frames are copied to a second compact disc, the duplicating equipment attaches new parity bytes to each data frame, but none of these new parity bytes have the "fingerprint" code present on the originally-produced compact disc.

The embedded "fingerprint" code can be used to detect authorized originally-produced compact discs. The "fingerprint" code can be detected either by detection hardware or software that can be added to standard playback equipment. The detection hardware or software can be programmed to permit normal playback if the "fingerprint" code is detected and to disable playback if the "fingerprint" code is not detected. Additionally, various error messages or other programs (e.g., admonishing the user against using pirated compact discs) can be played or displayed if the "fingerprint" code is not detected.

The above, and other objects, features and advantages of the present invention will be apparent from the following detailed description thereof which is to be read in connection with the accompanying drawings.

BRIEF DESCRIPTION OF THE DRAWINGS

FIG. 4 is a simplified diagram showing the flow of data frames as they are read from a compact disc for use by playback equipment or duplicating equipment having a "fingerprint" detector to practice the disclosed invention.

FIG. 5 is a simplified diagram showing the flow of data frames as they are read from a compact disc and copied to a target compact disc by a standard duplicating device without a "fingerprint" encoder.

FIG. 6 is a flowchart illustrating the logic flow employed by a playback device to detect the presence of a "fingerprint" code and act accordingly.

DETAILED DESCRIPTION OF THE INVENTION

The Reed-Soloman error correction system, a well-known methodology in the compact disc creation art, is used to detect and correct data errors that are present on the compact discs. Standard error detection and correction methodology detects and eliminates data errors as they are read from a compact disc so as to make such errors undetectable by the user. That is, error detection and correction methodology operates to diminish audio or visual imperfections in music or movie compact discs and software bugs in software compact discs.

Figure 1:
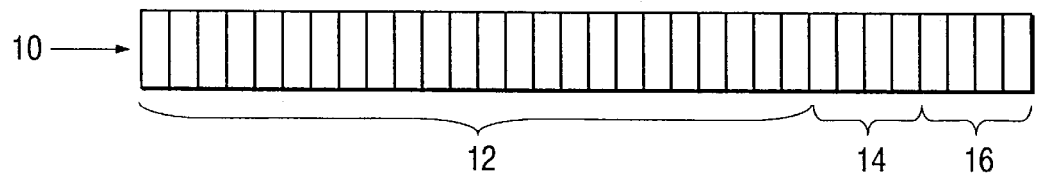
FIG. 1 is a simplified illustration of a thirty-two byte data frame having twenty-four real data bytes and eight parity bytes.

Data is organized on compact discs according to thirty-two byte data frames. The first twenty-four bytes of each data frame contains real data intended to be displayed, played or otherwise used by a playback device. That is, the first twenty-four bytes of each data frame contains actual music, video or software, depending on the application. The last eight bytes of each data frame are parity bytes which are appended to the twenty-four real data bytes for the purpose of detecting and correcting errors in the twenty-four real data bytes. All thirty-two bytes (twenty-four real data bytes and eight parity data bytes) of each data frame are stored on the compact disc. FIG. 1 shows a typical data frame having real data in the first twenty-four bytes 12 and eight parity bytes 14, 16 appended thereto.

Figure 2:
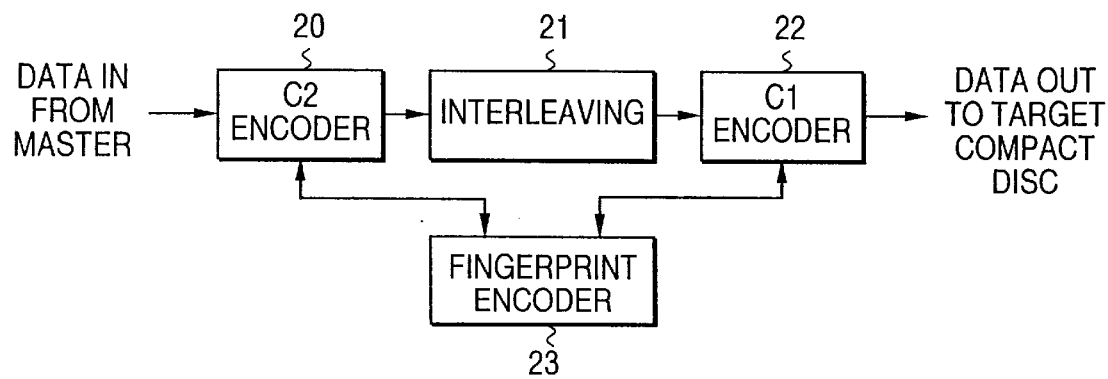
FIG. 2 is a simplified diagram showing the flow of data frames as they are recorded from a master to a destination compact disc.

It is well-known in the art that the eight parity bytes are encoded and appended to the twenty-four real data bytes by C1 and C2 encoders which process each data frame in sequence as real data is transferred from a "master" to target compact discs meant for sale to the public by "mastering" equipment. FIG. 2 shows a simplified illustration of the encoding process that occurs when data from a "master" is transferred to a target compact disc meant to be sold to the public by "mastering" equipment. First, groups of twenty-four real data bytes are indirectly transferred from the "master" to a C2 encoder 20. The C2 encoder 20 appends four parity bytes to the twenty-four real data bytes. Then the group of twenty 28 bytes is transferred through an interleaver 21 to a C1 encoder 22 which appends another four parity bytes to the existing twenty 28 bytes, creating a full thirty-two byte data frame. The complete data frame is then transferred to a target compact disc.

When a compact disc is used by a consumer, the data from a loaded compact disk is read into a computer, CD player, DVD player, or other playback equipment, depending upon the application. As the data frames from the compact disc are read into the playback equipment, the parity bytes of each data frame are used to detect and correct any possible data errors in reading the twenty-four real bytes prior to playback. This detection and correction methodology is well-known in the art.

Figure 3:
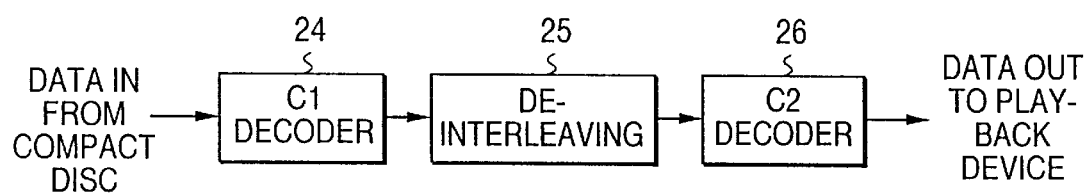
FIG. 3 is a simplified diagram showing the flow of data frames as they are read from a compact disc and processed by a playback device.

All playback devices (such as computers, CD players, DVD players, etc.) are equipped with C1 and C2 decoders. FIG. 3 shows a simplified illustration of data frames from a compact disc being processed by a typical playback device. During operation, data frames are read sequentially from the compact disc. As they are read, a C1 decoder 24 analyzes the last four parity bytes of each data frame for the purpose of detecting and correcting any errors in the twenty-four real data bytes of the data frame. After being processed by the C1 decoder 24, each data frame is transferred through a de-interleaver 25 to a C2 decoder 26 which analyzes the first four parity bytes of the data frame for the purpose of detecting and correcting any additional errors in the twenty-four real data bytes. By the time each data frame moves past the C2 decoder 26, the eight parity bytes of each frame are stripped, leaving only the corrected twenty-four real data bytes. These twenty-four real data bytes are then played, displayed or otherwise used by the playback device depending upon the application.

The present invention involves embedding a unique "fingerprint" code in the parity bytes of one or more of the data frames stored on the compact disc. The unique predetermined "fingerprint" code can be generated by using hardware or software "fingerprint" encoders to specially program the standard C1 encoder 22 or C2 encoder 20 to embed such a code in the parity bytes. Thus, according to the present invention, in one or more of the thirty-two-byte data frames transferred to the target compact disc, the parity bytes contain a predetermined "fingerprint" code used to identify the compact disc as an originally-produced, authorized compact disc. The "fingerprint" code can be any predetermined code, i.e., a predetermined error type and rate pattern, that can be stored in the parity bytes. As one example, an "E12" type error, i.e., a single symbol error encoded at the C2 encoder 20 at a rate of 10 frames per second, could be encoded on compact discs and designated as the "fingerprint." An "E12" type error would be an appropriate error type to use as the "fingerprint" since "E12" type errors do not occur in normal circumstances as isolated events umerous "fingerprint" encoding schemes of this type could be utilized.

When an originally-produced compact disc having a "fingerprint" code is used in a computer, CD player, or DVD player, the data frames are read from the compact disc and processed by the C1 and C2 decoders 24, 26 as described previously. As illustrated in FIG. 4, a hardware or software "fingerprint" detection mechanism 30 can be employed in playback devices to detect if the "fingerprint" is present. In the case of the example referenced above where the "fingerprint" was an "E12" type error, the "fingerprint" detection mechanism 30 would syncronously detect the single symbol errors embedded at the specific rate of 10 frames per second. If the "fingerprint" is detected, then the "fingerprint" detection mechanism 30 is able to determine that the compact disc that is being read is an originally-produced, authorized compact disc.

Because the eight parity bytes of each data frame are stripped from each data frame after the frame is read into the playback device and any errors are detected and corrected, the "fingerprint" does not affect the integrity or playback quality of the real data contained in the first twenty-four bytes of each data frame. Therefore, the inclusion of a "fingerprint" code in the parity bytes of one or more of the data frames is transparent to the user.

This invention discourages or prevents compact disc pirating because if an originally-produced, authorized compact disc is copied using standard duplicating equipment, the "fingerprint" code is not copied. FIG. 5 illustrates a simplified process for copying a compact disc using standard duplicating equipment. When compact discs are copied, the data frames are read from the source compact disc by the duplicating equipment. The parity bytes are stripped from each of the data frames by C1 and C2 decoders 24, 26 just as they are when a compact disc is read by a playback device for purposes of playing, displaying, or otherwise using the data. After errors in the incoming data frames have been detected and corrected and the parity bytes stripped, the data frames are written to a target compact disc. Just prior to being written to the target compact disc, each data frame is appended with new parity bytes by C1 and C2 encoders 20, 22 incorporated into the duplicating equipment. The encoding process performed by C1 and C2 encoders 20, 22 in standard duplicating equipment is identical to that performed by the C1 and C2 encoders 20, 22 used in mastering equipment. But since standard duplicating equipment does not employ "fingerprint" encoders 23, the predetermined "fingerprint" code that was embedded in the parity bytes of one or more data frames of the originally-produced, authorized compact disc is not transferred to the destination compact disc. Thus, the "fingerprint" code cannot be transferred to any compact disc using standard duplicating equipment.

When a compact disc that does not have the "fingerprint" code is loaded and a playback device attempts to read data frames from that compact disc, the "fingerprint" detection hardware or software incorporated in the playback device will not be able to verify that a "fingerprint" code exists on the compact disc. FIG. 6 illustrates a simplified process for detecting whether a compact disc has a "fingerprint" code and acting accordingly. After a data frame is read from a compact disc 34, the data frame is processed by a C1 decoder 35. Included in the C1 processing is an algorithm 36 originated by the "fingerprint" detector to determine if the pre-determined "fingerprint" is present on the compact disc. If the "fingerprint" is detected, then the data frame, absent the last four parity bytes, is passed to the C2 decoder 38 for error detection and correction processing. Then, the first twenty-four bytes of the data frame are sent on for playback by the playback device. If the "fingerprint" is not detected by the C1 decoder, the data frame, absent the last four parity bytes, is also passed on to the C2 decoder 39 (same C2 decoder that performs step 38). But now, included in the C2 processing is an algorithm 40 originated by the "fingerprint" detector to determine if the pre-determined "fingerprint" is present on the compact disc. If the "fingerprint" is detected by neither the C1 decoder or the C2 decoder, then the playback device can be disabled and further programmed to do various things 42. For example, in addition to disabling the playback of the compact disc, the playback device could run a program or display a message lecturing the user about using unlicensed compact discs, or the playback device could launch a promotional program or display a promotional message. In any event, the use of the pirated compact disc would be frustrated.

Many variations of the above-described invention are possible. For example, any specific useful data can be encoded into the parity bytes as described herein. Data such as ID codes, ISRC codes, etc. could be encoded in the parity bytes on compact discs and later detected and used by playback devices. Additionally, though this invention has been described primarily for use in connection with compact discs, this invention can be used in connection with any digital storage medium, including floppy discs.

The preceding description is exemplary rather than limiting in nature. A preferred embodiment of this invention has been disclosed to enable one skilled in the art to practice this invention. Variations and modifications are possible without departing from the spirit and purview of this invention, the scope of which is limited only by the appended claims.

I claim:

1. A method for authenticating a digital storage device used for storing data frames having one or more parity bytes, comprising the steps:

embedding a predetermined fingerprint code in one or more of the parity bytes of one or more of the data frames stored on the digital storage device;

detecting said predetermined fingerprint code; and performing a function based upon whether or not said predetermined fingerprint code is detected.

2. The method of claim 1, wherein said performed function comprises the step of disabling playback of the data frames stored on the storage device.

3. The method of claim 1, wherein said embedding step is performed during mastering of the digital storage device.

4. The method of claim 2, wherein said embedding step is performed during mastering of the digital storage device.

5. The method of claim 1, wherein said fingerprint detecting step is performed prior to playback of any of the data frames stored on the digital storage device.

6. The method of claim 2, wherein said fingerprint detecting step is performed prior to playback of any of the data frames stored on the digital storage device.

7. The method of claim 1, further comprising the steps:

reading the data frames from the storage device; and detecting and correcting data errors contained in the data frames.

8. The method of claim 7, wherein said fingerprint detecting step is performed substantially simultaneously with said detecting and correcting step.

9. The method of claim 1, wherein said embedding a predetermined fingerprint code comprises embedding an indication of a particular error and a particular rate in parity bytes of said data frames.

10. The method of claim 9, wherein said particular error is an E-12 type error.

11. A system for providing and using an authenticating fingerprint code on a data storage device, on which digital data is stored in frames, each frame including parity bytes, the system comprising:

an input for receiving digital data to be recorded on said data storage device;

an encoding system for generating parity bytes for frames of said digital data; and a fingerprint encoder communicating with said encoding system to write said authenticating fingerprint in said parity bytes generated by said encoding system.

12. The system of claim 11, further comprising a recording device for recording data frames with associated parity bytes and said authenticating fingerprint from said encoding system on a data storage device.

13. The system of claim 12, wherein said recording device is a compact disc recording device and said data storage device is a compact disc.

14. The system of claim 11, wherein said encoding system comprises:

a C2 encoder;

an interleaver receiving an output of said C2 encoder; and a C1 encoder receiving an output of said interleaver.

15. The system of claim 11, further comprising a playback device for reading said digital data from said data storage device, said playback device further comprising a fingerprint detector for detecting said authenticating fingerprint in said parity bytes.

16. The system of claim 15, wherein said fingerprint detector performs a function based on whether said authenticating fingerprint is detected.

17. The system of claim 16, wherein said function comprises disabling playback of said data storage device by said playback device.

18. The system of claim 11, wherein said authenticating fingerprint code comprises an indication of a particular error at a particular rate in said parity bytes of said data frames.

19. The system of claim 18, wherein said particular error is an E-12 type error.

20. A playback device for a data storage device on which digital data is stored in data frames with parity bytes being appended to said data frames, the playback device comprising:

a decoding system for decoding digital data read from said data storage device;

a fingerprint detector connected to said decoding system for detecting an authenticating fingerprint code encoded in said parity bytes of said data frames.

21. A playback device of claim 20, wherein said fingerprint detector interrupts reading of said data storage device upon failure to detect said authenticating fingerprint code in said parity bytes.

22. A method for authenticating a digital storage device used for storing data frames having one or more parity bytes, comprising embedding a predetermined fingerprint code in one or more of the parity bytes of one or more of the data frames stored on the digital storage device.

* * * * *